(12) United States Patent
Kanma

(10) Patent No.: US 8,259,185 B2
(45) Date of Patent: Sep. 4, 2012

(54) TERMINAL DEVICE, CONNECTABLE POSITION INFORMATION DISPLAY METHOD AND PROGRAM

(75) Inventor: Hiroshi Kanma, Kanagawa (JP)

(73) Assignee: Sony Corporation, Tokyo (JP)

( * ) Notice: Subject to any disclaimer, the term of this patent is extended or adjusted under 35 U.S.C. 154(b) by 464 days.

(21) Appl. No.: 12/534,451

(22) Filed: Aug. 3, 2009

(65) Prior Publication Data

US 2010/0079599 A1    Apr. 1, 2010

(30) Foreign Application Priority Data

Sep. 30, 2008 (JP) ................................. 2008-254416

(51) Int. Cl.
*H04N 5/232* (2006.01)

(52) U.S. Cl. .................. 348/211.1; 348/211.4; 455/464; 455/509

(58) Field of Classification Search .................. 348/157, 348/158, 207.1, 239, 333.02, 374, 375, 376, 348/211.1, 211.4, 211.8; 455/414.1, 404.2, 455/556.1, 556.2, 452.1, 454, 450, 464, 509, 455/511, 515, 522; 463/29; 705/14.64, 50; 345/158; 361/679.26; 701/200, 205, 206, 701/207, 213, 214; 367/118
See application file for complete search history.

(56) References Cited

U.S. PATENT DOCUMENTS

| | | | |
|---|---|---|---|
| 7,054,627 B1 * | 5/2006 | Hillman | 455/422.1 |
| 2001/0024236 A1 * | 9/2001 | Sato et al. | 348/239 |
| 2007/0280152 A1 * | 12/2007 | Thomson et al. | 370/328 |
| 2007/0291303 A1 * | 12/2007 | Tanaka et al. | 358/1.15 |
| 2008/0122950 A1 | 5/2008 | Uchiyama | |
| 2008/0160957 A1 * | 7/2008 | Ono | 455/408 |
| 2008/0317456 A1 * | 12/2008 | Lee et al. | 396/321 |
| 2009/0047924 A1 * | 2/2009 | Ray et al. | 455/404.2 |
| 2009/0061870 A1 * | 3/2009 | Finkelstein et al. | 455/435.2 |
| 2009/0280824 A1 * | 11/2009 | Rautiainen | 455/456.1 |
| 2009/0322788 A1 * | 12/2009 | Sawano | 345/632 |

FOREIGN PATENT DOCUMENTS

JP        2008-28993        2/2008

* cited by examiner

*Primary Examiner* — Tuan Ho
*Assistant Examiner* — Kent Wang
(74) *Attorney, Agent, or Firm* — Oblon, Spivak, McClelland, Maier & Neustadt, L.L.P.

(57) ABSTRACT

A terminal device includes: a communication means radio communicatable to access points; a storage means for storing a database associating identification information and position information of an access point connected with the communication means in association with each other; a position information acquiring section that acquires current position information; and a control section that causes a display section to display related information of the access point based on the database when the communication means does not detect a connectable access point.

11 Claims, 8 Drawing Sheets

FIG.3

| MAC ADDRESS | LATITUDE | LONGITUDE |
| --- | --- | --- |
| 00-00-00-00-00-00 | +35.62 | +139.73 |
| 00-00-00-00-00-01 | +38.90 | +139.59 |
| 00-00-00-00-00-02 | +36.80 | +138.11 |
| ⋮ | ⋮ | ⋮ |
| FF-FF-FF-FF-FF-FF | +35.60 | +134.02 |

FIG.4

| SSID | VERIFICATION KEY | MAC ADDRESS | LATITUDE | LONGITUDE |
| --- | --- | --- | --- | --- |
| AP1 | Xxxxx | 00-00-00-00-00-00 | +35.62 | +139.73 |
| | | 00-00-00-00-00-02 | +36.80 | +138.11 |
| | | FF-FF-FF-FF-FF-FF | +35.60 | +134.02 |
| AP2 | Yyyyy | 22-22-22-22-22-22 | +35.46 | +139.62 |
| AP3 | Zzzzz | 33-33-33-33-33-33 | +35.10 | +136.52 |

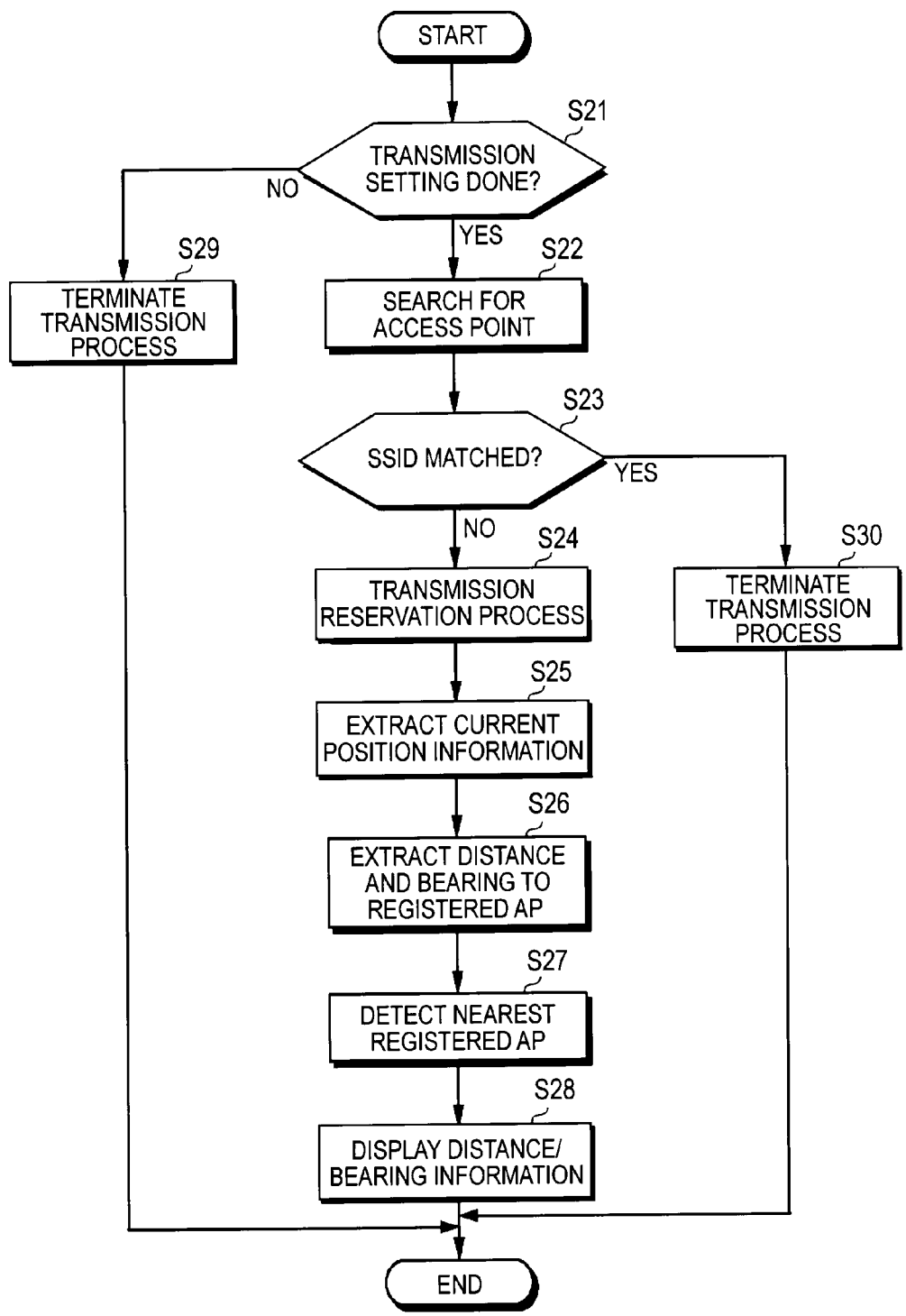

FIG.8

| MAC ADDRESS | LATITUDE | LONGITUDE | PUBLIC WIRELESS LAN CONNECTING SERVICE PROVIDER | SHOP INFORMATION |
|---|---|---|---|---|
| 00-00-00-00-00-00 | +35.62 | +139.73 | COMPANY A | ○○STATION |
| 00-00-00-00-00-01 | +38.90 | +139.59 | COMPANY B | △△AIRPORT |
| 00-00-00-00-00-02 | +36.80 | +138.11 | COMPANY A | □○COFFEE×△SHOP |
| ... | ... | ... | ... | ... |
| FF-FF-FF-FF-FF-FF | +35.60 | +134.02 | COMPANY A | □○COFFEE□×SHOP |

FIG.9

| SSID | VERIFICATION KEY | PUBLIC WIRELESS AN CONNECTING SERVICE PROVIDER | MAC ADDRESS | LATITUDE | LONGITUDE | NUMBER OF CONNECTIONS | SHOP INFORMATION |
|---|---|---|---|---|---|---|---|
| AP1 | Xxxxx | COMPANY A | 00-00-00-00-00-00 | +35.62 | +139.73 | 10 | ○○STATION |
|  |  |  | 00-00-00-00-00-02 | +36.80 | +138.11 | 3 | □○COFFEE×△SHOP |
|  |  |  | FF-FF-FF-FF-FF-FF | +35.60 | +134.02 | 0 | □○COFFEE□×SHOP |
| AP2 | Yyyyy | COMPANY C | 22-22-22-22-22-22 | +35.46 | +139.62 | 12 | ××BURGER△○SHOP |
| AP3 | Zzzzz | — | 33-33-33-33-33-33 | +35.10 | +136.52 | 4 | □□AIRPORT |
| ... | ... | ... | ... | ... | ... | ... | ... |

TERMINAL DEVICE, CONNECTABLE POSITION INFORMATION DISPLAY METHOD AND PROGRAM

BACKGROUND OF THE INVENTION

1. Field of the Invention

The present invention relates to a terminal device connectable to a network, and, particularly, to a terminal device, a connectable position information display method, and a program which can transmit photographed image data over a network.

2. Description of the Related Art

Digital cameras which photograph a subject are used widely. Recently, digital cameras having a wireless LAN (Local Area Network) capability are becoming popular to transmit photographed images to a photograph sharing site or the like using the wireless LAN capability. The transmission of photographed images is carried out with a digital camera connected to, for example, a wireless LAN access point at home or an access point of a public wireless network provided in a city.

Areas where a digital camera can establish radio communication with an access point are mainly a place inside a house like home, a place in a restaurant, and a station, and places where transmission of photographed images is carried out are restricted to those areas. It is therefore power consumable to always search for an access point to find a radio communicatable area for a digital camera to transmit images, which is likely to interfere the original purpose of digital cameras to photograph images.

To cope with the situation, JP-A-2008-28993 (Patent Document 1) describes the configuration of determining whether the current position of a user is in an area where communication to an access point can be established by using position information of a connectable access point and current position information acquired from an external device. According to the configuration, an attempt to establish communication to a network when it is determined that the current position lies in a connectable area.

The configuration described in Patent Document 1 can prevent a digital camera from consuming power through a constant search for an access point.

SUMMARY OF THE INVENTION

However, the configuration described in Patent Document 1 merely determine whether the current position of a user is in an area where communication to an access point can be established, and informs the user of the determination result, so that the user who is located near a connectable area may not enter the connectable area and miss a chance of transmitting an image. Although the configuration described in Patent Document 1 uses an external device to acquire the current position of the user, the use of an external device to acquire a current position complicates the system. In addition, a digital camera if provided with the function of the external device described in Patent Document 1 constantly attempts to acquire position information, and thus brings about the problem of increased power consumption again.

It is therefore desirable to provide a terminal device, a connectable position information display method, and a program that search for an access point which can make wireless LAN connection with lower power consumption, and can transmit photographed images through the wireless LAN connection.

According to an embodiment of the present invention, there is provided a terminal device including a communication means radio communicatable to access points; a storage means for storing a database associating identification information and position information of an access point connected with the communication means in association with each other; a position information acquiring section that acquires current position information; and a control section that causes a display section to display related information of the access point based on the database when the communication means does not detect a connectable access point.

In the terminal device, the related information is preferably at least one of distance information and bearing information from a current position to the access point, and name information of the access point. In the terminal device, it is preferable that the control section should arrange the related information of access points registered in the database in an order of a distance from the current position or a number of connections established to the access points, and cause the display section to display the related information.

In the terminal device, the position information acquiring section preferably acquires the current position information based on information from a GPS or MAC addresses of a plurality of access points and signal intensities thereat.

In the terminal device, it is preferable that when a transmission request for data is input to the control section and when the communication means is unable to radio communication, the control section performs transmission reservation to schedule transmission of the data, and cause the display section to display that the transmission reservation is made when the communication means becomes radio communicatable, with the transmission reservation being made. The terminal device may further include image pickup means that picks up an image of a subject, wherein the data is picked-up image data of the subject.

In the terminal device, the related information of the access point may further include a map around the access point.

In the terminal device, the related information of the access point may further include route information from a current position to the access point.

According to another embodiment of the invention, there is provided a display method including causing communication means to establish radio communication to access points; storing a database associating identification information and position information of an access point connected with the communication means in association with each other; acquiring current position information; and causing display means to display related information of the access point based on the database when the communication means does not detect a connectable access point.

According to a further embodiment of the invention, there is provided a computer readable recording medium recording a program that allows a computer to execute processes of causing communication means to establish radio communication to access points; storing a database associating identification information and position information of an access point connected with the communication means in association with each other; causing acquisition means to acquire current position information; and causing display means to display related information of the access point based on the database when the communication means does not detect a connectable access point.

According to the embodiments of the invention, even when there is not a connectable access point, it is possible to inform a user of a nearby access point in access points which have established connection in the past.

According to the embodiments of the invention, when a user is located in an area unable to radio communication, it is possible to display a nearby connectable area, so that the user can know a connectable place without making constant detection of an access point.

BRIEF DESCRIPTION OF THE DRAWINGS

FIG. 3 is an outlined line diagram showing one example of a position information database of access points to be stored in the digital camera according to the embodiment of the invention;

FIG. 4 is an outlined line diagram showing one example of a position information database of access points to which the digital camera according to the embodiment of the invention is connected;

FIG. 6 is a flowchart illustrating one example of a process of displaying connectable locations in the digital camera according to the embodiment of the invention;

FIG. 8 is an outlined line diagram showing another example of the position information database of access points to be stored in the digital camera according to the embodiment of the invention;

FIG. 9 is an outlined line diagram showing a further example of the position information database of access points to be stored in the digital camera according to the embodiment of the invention.

DETAILED DESCRIPTION OF THE PREFERRED EMBODIMENTS

Figure 1:
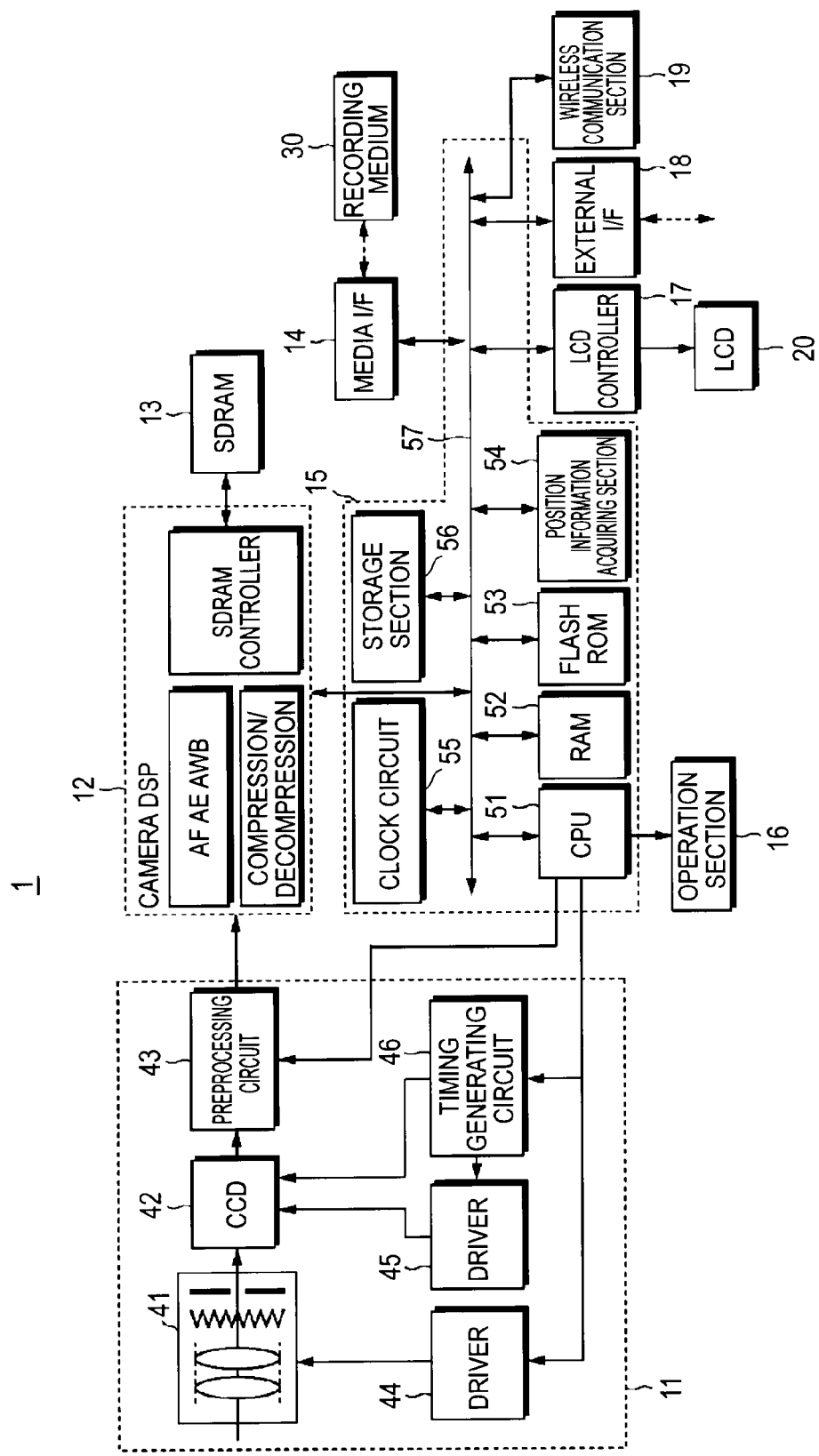
FIG. 1 is a block diagram showing one example of the configuration of a digital camera according to an embodiment of the present invention.

A preferred embodiment of the present invention will be described below with reference to the accompanying drawings. The configuration of the terminal device to be described below is just one example of the configuration of a terminal device according to the embodiment of the invention, and is not restrictive.

Outline of Embodiment of the Invention

A digital camera which is a terminal device according to the embodiment of the invention has a wireless LAN capability, and has a function of transmitting a photographed image to, for example, a photograph sharing site via the wireless LAN capability. The digital camera stores an access point position information database (hereinafter called as AP position information DB) where, for example, physical addresses and position information of access points of a wireless LAN are associated with each other. As the physical address of an access point, for example, an MAC (Media Access Control) address is used. As the position information of an access point, for example, the latitude and longitude are used.

Further, the digital camera stores a registered access point information database (hereinafter called as registered AP information DB) where at least identification information and position information of those of access points included in the AP position information DB to which the digital camera has actually made wireless LAN connection are stored. Information of each access point stored in the registered AP information DB is associated with a service set identifier (hereinafter called as SSID) to be identified by the SSID. An access point which needs a verification key is also associated with the verification key. The number of access points to be registered in the registered AP information DB is increased according to the wireless LAN connection state of the digital camera.

When a connectable wireless LAN access point cannot be retrieved, information on a connectable area is retrieved based on the current position of the digital camera and information from the registered AP information DB, and displayed. Although the details will be given later, when a connectable wireless LAN access point cannot be retrieved, the current position of the digital camera is detected based on the signal intensities of radio communication signals from a plurality of unconnectable wireless LAN access points. Information on a connectable area can be displayed in terms of, for example, a bearing and distance from the current position, or the name of a shop, a station or the like near the current position.

A public wireless LAN connecting service is provided by a plurality of connection service providers at present. The description of the invention will be given of a case where a user having a digital camera 1 makes a service use contract with at least one of the connection service providers to enable public wireless LAN connection. The digital camera 1 can perform wireless communication with an access point of the connection service provider with whom the user has made the service use contract, to transmit and receive data.

The digital camera 1 can also receive radio waves from an access point of a connection service provider with whom the user has not made the service use contract. In case where an attempt for wireless LAN connection via such an access point is made, however, verification fails. As a result, the digital camera 1 cannot perform transmission or the like of desired data.

According to the embodiment of the invention, the contents of the service use contract with a connection service provider are not accountable. In addition, means for a verification method for using a wireless LAN network, such as whether or not a verification key for the SSID or the like of an access point is needed, is not accountable either.

The following gives a detailed description of how to connect the digital camera 1 according to the embodiment of the invention to a wireless LAN network.

Configuration of Digital Camera

FIG. 1 is a block diagram showing one example of the configuration of the digital camera 1 according to an embodiment of the invention. As shown in FIG. 1, the digital camera 1 according to the embodiment is roughly divided into a camera section 11, a camera DSP (Digital Signal Processor) 12, an SDRAM (Synchronous Dynamic Random Access Memory) 13, a media interface (hereafter called as a media I/F) 14, a control section 15, an operation section 16, a liquid crystal display (hereafter called as LCD) controller 17, an LCD 20, an external interface (hereafter called as external I/F) 18, and a wireless communication section 19. The digital camera 1 is configured to detachably load a recording medium 30.

As the recording medium 30, various media, such as a so-called memory card based on a semiconductor memory, an optical recording medium like a recordable DVD (Digital Versatile Disc) or a recordable CD (Compact Disc), and a magnetic disc, may be available. Although the recording medium 30 is configured to be detachable, it may be configured to be installed in the digital camera 1. The following description of the embodiment is given on the premise that a semiconductor memory or a hard disk drive may be used for the recording medium 30.

The camera section 11 includes an optical block 41, a CCD (Charge Coupled Device) 42, a preprocessing circuit 43, an optical block driver 44, a CCD driver 45, and a timing generating circuit 46 as shown in FIG. 1. The optical block 41 includes a lens, a focus mechanism, a shutter mechanism, an iris mechanism, for example. The optical block 41 includes a lens section.

The control section 15 includes a CPU (Central Processing Unit) 51, a RAM (Random Access Memory) 52, a flash ROM (Read Only Memory) 53, a position information acquiring section 54, a clock circuit 55, and a storage section 56 that are interconnected by a system bus 57. The control section 15 may be a general-purpose built-in type microcomputer or dedicated system LSI (Large Scale Integrated) circuit, for example. The control section 15 can control the individual components of the digital camera 1.

The RAM 52 is used mainly as a work area in which intermediate processing results are temporarily stored. The flash ROM 53 stores various programs to be executed by the CPU 51 and data necessary for the execution. The position information acquiring section 54 extracts position information from the results (signal intensities) of detecting access points, and extracts distance/bearing information to a connectable area from latitude/longitude information of an access point for a connectable wireless LAN. The clock circuit 55 can provide a current year, month, and day, a current day of the week, and a current time, as well as the date at which image pickup is made. The storage section 56 stores an AP position information DB where the identification information and position information of the established connectable wireless LAN access point are associated with each other. The storage section 56 also stores a registered AP information DB which stores at least the identification information and position information of access points to which the digital camera 1 has actually established wireless LAN connection.

At the time of picking up an image, under the control of the control section 15, the optical block driver 44 generates a drive signal for driving the optical block 41 and supplies the generated drive signal to the optical block 41 to make the optical block 41 operable. According to the drive signal supplied from the optical block driver 44, the focus mechanism, the shutter mechanism, and the iris mechanism of the optical block 41 are controlled. The optical block 41 captures an optical image of a subject to form the captured image onto the CCD 42.

The CCD 42 photoelectrically converts the optical image supplied from the optical block 41 into an electrical signal and outputs the electrical signal. Namely, the CCD 42 operates according to the drive signal supplied from the CCD driver 45, captures the optical image of the subject from the optical block 41, converts the captured image (or image information) of the subject into an electrical signal based on a timing signal supplied from the timing generating circuit 46 which is controlled by the control section 15, and supplies the electrical signal to the preprocessing circuit 43.

It is to be note that a photoelectric conversion device, such as a CMOS (Complementary Metal-Oxide Semiconductor) sensor, may be used instead of the CCD 42.

As described above, the timing generating circuit 46 forms a timing signal for providing predetermined timing under the control of the control section 15. The CCD driver 45 generates a drive signal to be supplied to the CCD 42 based on the timing signal supplied from the timing generating circuit 46.

The preprocessing circuit 43 executes CDS (Correlated Double Sampling) processing on the image information carried by the electrical signal supplied from the CCD 42 to keep an S/N ratio in a good condition. The preprocessing circuit 43 also executes AGC (Automatic Gain Control) processing to control the gain, and executes A/D (Analog/Digital) conversion, thereby yielding image data that is a digital signal.

The digital-signal image data acquired by the preprocessing circuit 43 is supplied to the camera DSP 12. The camera DSP 12 executes camera signal processing, such as AF (Auto Focus), AE (Auto Exposure), and AWB (Auto White Balance), on the supplied image data. The image data thus undergone various adjustment processes is then encoded by a predetermined encoding algorithm, such as JPEG (Joint Photographic Experts Group) or JPEG 2000. The encoded image data is then supplied to the recording medium 30 loaded on the digital camera 1 of the embodiment via the system bus 57 and the media I/F 14, to be recorded in the recording medium 30 as a file, which will be described later. It is also possible to encode an image data group by an encoding algorithm for moving images, such as MPEG (Motion Picture Experts Group), thereby generating a moving image file to be recorded in the recording medium 30.

Target image data is read from the recording medium 30 via the media I/F 14 in accordance with the operation input made by the user through the operation section 16 having a touch panel and control keys, for example. Then, the read image data is supplied to the camera DSP 12. The operation section 16 is provided with buttons for performing various operations. The buttons include a mode dial for selecting an image pickup mode for picking up the image of a subject, a view mode at the time of displaying image data on the LCD 20, a print mode at the time of printing image data, and so forth. The operation section 16 is also provided with other buttons, such as a zoom button for adjusting the zoom magnification, operation buttons including direction buttons and a set button for moving the cursor, selecting an item and settling the item, and a network button which is operated at the time of connecting to a wireless LAN. In accordance with an operation input made by the user using the operation section 16, it is possible to performs processes, such as registration of a wireless LAN connecting service, and inputting of a verification key.

The camera DSP 12 decodes the encoded image data read from the recording medium 30 and supplied through the media I/F 14, and supplies the decoded imaged data to the LCD controller 17 via the system bus 57. The LCD controller 17 generates an image signal from the supplied image data, and supplies the formed image signal to the LCD 20. Consequently, the image according to the image data recorded in the recording medium 30 is displayed on the display screen of the LCD 20.

The digital camera 1 according to the embodiment also has the external I/F 18 through which the digital camera 1 is connected to an external personal computer, for example, to receive image data from the connected personal computer and record the received image data in the recording medium 30 loaded on the digital camera 1. Image data recorded in the recording medium 30 can be supplied to the external personal computer or the like.

It is to be noted that the wireless communication section 19 is a wireless interface which is compliant with the standards of the IEEE (Institute of Electrical and Electronic Engineers) 802.11 (a/b/g/j/n (under development)). In case where an access point is a GSM (Global System for Mobile Communication) base station or a Bluetooth base station, the wireless communication section 19 may be a wireless interface compliant with the standards thereof.

Information, such as image data acquired via an external personal computer or a network and recorded in a recording medium can be read and reproduced by the digital camera 1 according to the embodiment, and displayed on the LCD 20.

[System of Acquiring Current Position]

Figure 2:
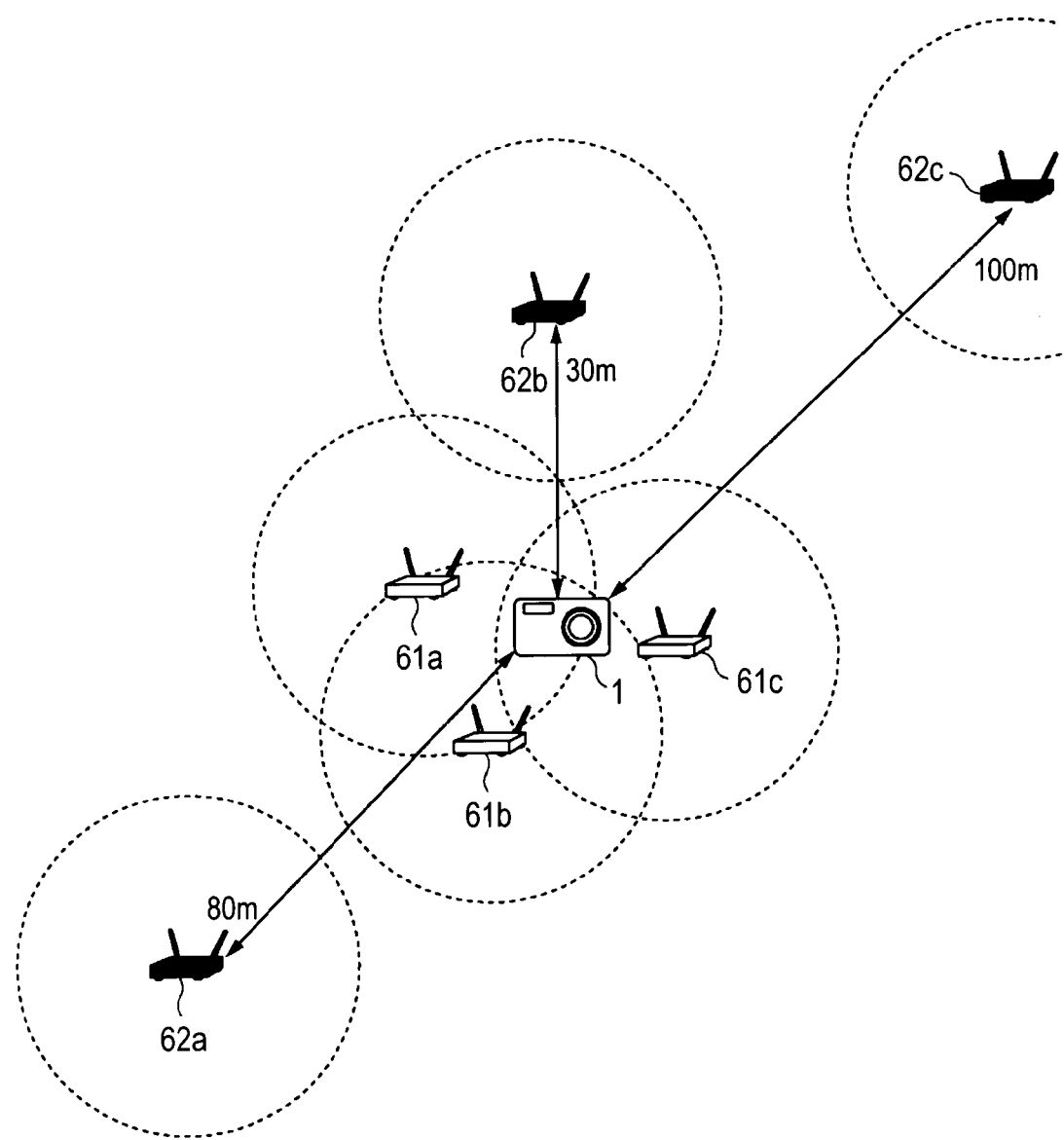
FIG. 2 is an outlined line diagram showing how the digital camera according to the embodiment of the invention detects access points.

FIG. 2 shows a system of acquiring the current position of the digital camera 1 according to the embodiment of the invention. FIG. 3 schematically shows the AP position information DB which is prestored in the digital camera 1 and where the physical addresses and position information of wireless LAN access points are associated with each other. FIG. 4 schematically shows the registered AP information DB storing the identification information and position information of access points to which the digital camera has actually established wireless LAN connection. While the latitude and longitude are used as position information in FIGS. 3 and 4, "+" used for latitude information represents the North latitude and "+" used for longitude information represents the West longitude.

Access Point Position Information Database

The AP position information DB as shown in FIG. 2 is prestored in the storage section 56 at the time of shipping the digital camera 1, for example, and includes, for example, information on public wireless LAN access points in Japan. After shipping the digital camera 1, a predetermined database may be downloaded and stored in the storage section 56 via a personal computer or the like. The AP position information DB may be replaced with a database containing information on specific areas as needed. This makes it possible to effectively reduce the memory. Connecting the digital camera 1 to the Internet or to an external recording medium containing new access point information enables an update process, such as addition of new access points and deletion of undesired access points.

Further, an external recording medium storing an AP position information DB for each area (including outside a country) may be loaded into the digital camera 1 to be used.

[Registered Access Point Information Database]

The registered AP information DB shown in FIG. 4 stores access points actually connected with the digital camera 1 as a database. For example, a plurality of MAC addresses are stored for SSID=AP1. This is a case where a plurality of access points respectively set for restaurants, stations, etc. are managed by a common SSID and verification key in a public wireless LAN connecting service which is provided based on a single SSID and verification key.

Access points included in the registered AP information DB (hereinafter called registered access points whenever desirable) already have a history of connections to the digital camera 1 and can be considered to be surely wireless LAN connectable. When it is found later that wireless LAN connection is not possible due to, for example, deimplementation of an access point itself, however, the registered access point is deleted from the registered AP information DB.

When an access point which is not registered in the AP position information DB is searched and registered in the registered AP information DB, information on this access point may be registered in the AP position information DB too. This can make the database for acquiring position information satisfactory.

[Method of Acquiring Current Position Information]

According to the embodiment of the invention, when acquisition of a current position is carried out mainly when it is determined that the digital camera 1 is not under a network connectable environment, i.e., when it is determined that communicatable access points do not include an access point which has a matched SSID and to which image data can be transmitted.

In FIG. 2, access points 61*a* to 61*c* are access points with unmatched SSIDs which are found in the search performed by the digital camera 1. The access points 61*a* to 61*c* are transmitted to the AP position information DB in FIG. 3. Access points 62*a* to 62*c* are registered access points which have a history of connections to the digital camera 1 and are registered in the registered AP information DB in FIG. 4.

To inform the presence of access points, each access point can regularly transmit a beacon signal. The beacon signal includes an MAC address unique to each access point. Accordingly, the digital camera 1 can known the MAC address of a nearby access point based on the received beacon signal.

According to the embodiment of the invention, when it is determined that communicatable access points do not include an access point which has a matched SSID, the current position is acquired and distance/bearing information or the like to an access point or area where wireless LAN connection is possible is displayed on the LCD 20. The current position can be extracted based on the MAC addresses of the access points 61*a* to 61*c* found in the search, and the signal intensities from the access points 61*a* to 61*c*. The program that extracts a position employs the system described in JP-A-2008-131301 which acquires position information based on the signal intensity from an access point. According to the system, a current position can be specified even when it is indoor, underground or the like where GPS (Global Positioning System) is not functionable. Such current position extraction is carried by the position information acquiring section 54 of the digital camera 1.

When a current position is specified, the access points 62*a* to 62*c* near the current position are selected based on the registered AP information DB, so that the user can be informed of a wireless LAN connectable area. The method of informing the user of a wireless LAN connectable area will be described later.

The acquisition of a current position is not restrictive, and the current position may be acquired at an arbitrary timing. FIG. 2 illustrates that three access points are detected, which is not restrictive.

Figure 5:
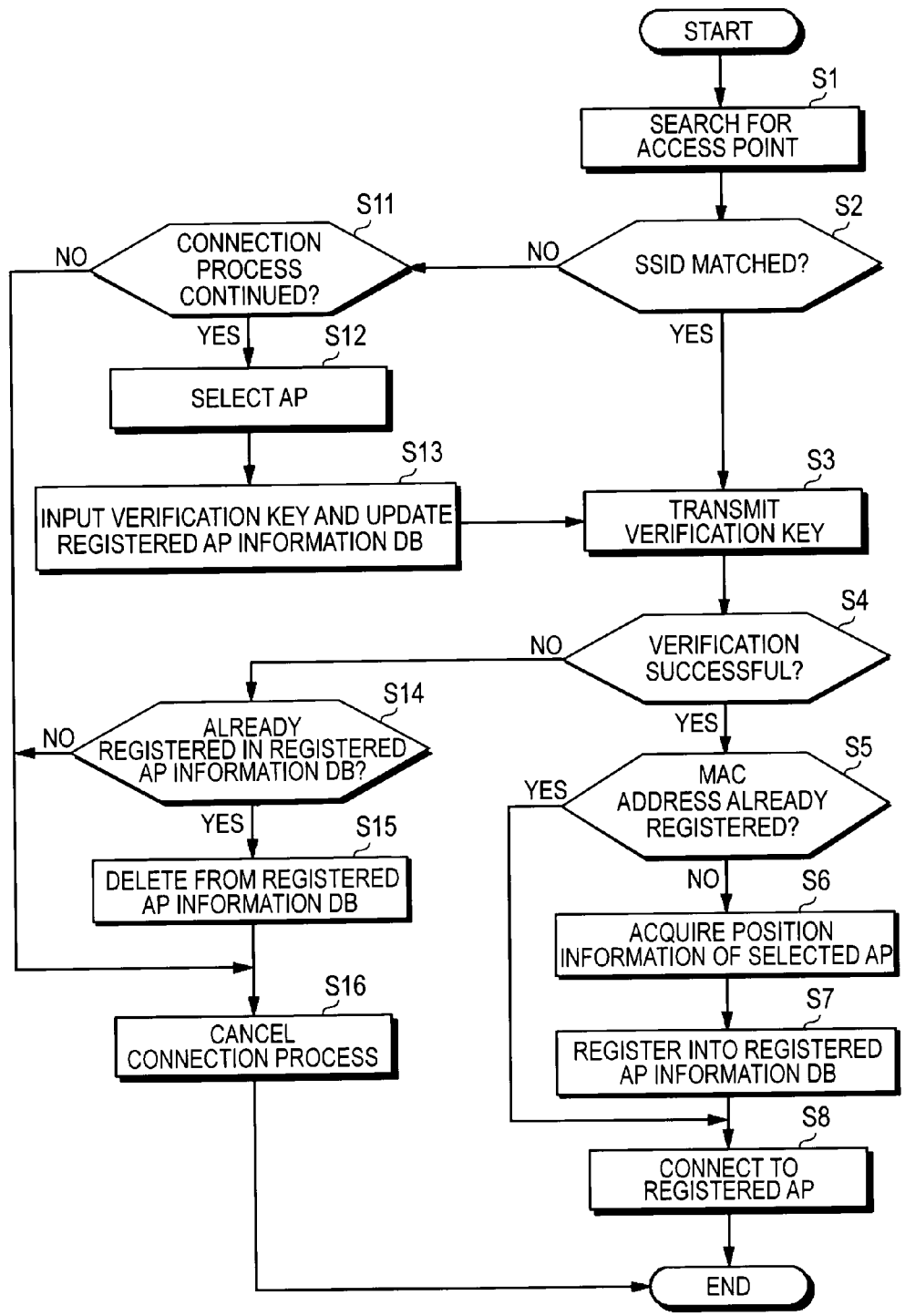
FIG. 5 is a flowchart illustrating one example of a process of updating the position information database of access points to which the digital camera according to the embodiment of the invention is connected.

Update of Registered Access Point Information Database and Wireless LAN Connection A process for the digital camera 1 to update the registered AP information DB for establishing wireless LAN connection and to establish wireless LAN connection based on the registered AP information DB will be described in detail referring to a flowchart illustrated in FIG. 5. According to the embodiment of the invention, wireless LAN connection is established, for example, at the time of transmitting image data, and information on connectable access points inn the then detected access points is added to the registered AP information DB. However, a process of connecting to a network regardless of the timing of transmitting image data may be executed to update the registered AP information DB. Because there are a small amount of information (few registered access points) in the registered AP information DB at the time the digital camera 1 is purchased, particularly, such an update process is effective.

First, as the user operates the network button on the operation section 16, the control section 15 is controlled to search for access points in step S1. As a result, information on an access point located near the digital camera 1, such as the MAC address, SSID and signal intensity, is acquired.

Then, in step S2, it is determined whether or not the acquired SSID matches with an SSID included in the registered AP information DB. When it is determined that the acquired SSID has a match, the MAC address of the access point is stored, and the process goes to step S3. When there are a plurality of access points whose SSIDs have a match, the user may select to which access point the connection is to be made. Alternatively, connection to a nearest access point may be made automatically. When it is determined that the acquired SSID does not have a match, the process proceeds to step S11. When an access point cannot be detected, the process also proceeds to step S11.

In step S11, it is determined whether or not to continue the connection process. When it is determined that the connection process will not be continued, the connection process is canceled in step S16, and the process is terminated. It is to be noted that the user determines whether or not to continue the connection process, and selects a process based on, for example, an input made by an operation button on the operation section 16. When an access point cannot be detected, it may be automatically determined that the connection process is not continued, so that the process proceeds to step S16. In this case, detection of no access point may be displayed on the LCD 20 to inform the user of the event.

When it is determined in step S11 that the connection process is to be continued, an access point connection to which is to be attempted is selected from the detected access points in step S12 for updating the registered AP information DB. At this time, the MAC address of the selected access point is stored. Subsequently, in step S13, a verification key corresponding to the SSID of the selected access point is input to update the registered AP information DB, after which the process proceeds to step S3. Here, the selection of an access point and inputting of a verification key are carried out by the user operating operation buttons on the operation section 16.

In step S3, the verification key which corresponds to the SSID of the access point connection to which is to be attempted is extracted from the registered AP information DB, and the verification key is transmitted to the access point. When verification is successful in step S4, the process proceeds to step S5.

In step S5, it is determined whether or not the stored MAC address is registered as the MAC address of the corresponding SSID in the registered AP information DB. When the MAC address is registered, connection is made to the access point in step S8, after which the process is terminated.

When it is determined in step S5 that the stored MAC address is not registered as the MAC address of the corresponding SSID in the registered AP information DB, latitude/longitude information of the selected access point is acquired in step S6. The latitude/longitude information is retrieved from the AP position information DB based on the stored MAC address.

Then, in step S7, the MAC address of the selected access point and the retrieved latitude/longitude information are registered in the registered AP information DB to be associated with the corresponding SSID. At this time, when the AP position information DB contains information other than the latitude/longitude information, the information may also be registered in the registered AP information DB. Then, connection is made to the access point in step S8, after which the process is terminated.

When verification has failed in step S8, the process proceeds to step S14. In step S14, it is determined whether or not the MAC address of the selected access point is registered in the registered AP information DB. When it is determined that the MAC address is not registered, the connection process is canceled in step S16, after which the process is terminated. When it is determined in step S14 that the MAC address is registered, the process proceeds to step S15. In step S15, the MAC address and the corresponding latitude/longitude information are deleted from the registered AP information DB. When the MAC address and the corresponding SSID are registered in one-to-one correspondence, the SSID is deleted too. Finally, the connection process is canceled in step S16, after which the process is terminated.

As described above, the amount of information on access points to be registered in the registered AP information DB is increased according to the network connection process. Access points included in the registered AP information DB are treated to be connectable with the digital camera 1. When verification based on a verification key fails, however, the access point is considered as being unconnectable, and the corresponding MAC address or the like is deleted from the registered AP information DB. Accordingly, the registered AP information DB is updated properly.

[Image Data Transmission and Display of Connectable Area]

Next, a process of displaying a connectable area when transmission of image data has been attempted but has failed will be described in detail referring to a flowchart illustrated in FIG. 6. FIG. 6 shows a process of causing the digital camera 1 to pick up an image with the registered AP information DB stored through the process illustrated in FIG. 5, and transmit image data recorded in the recording medium 30 outside.

According to the embodiment of the invention, when wireless LAN connection is possible at the time of transmitting image data, the image data is transmitted then. In a case where wireless LAN connection is not possible at the time of transmitting image data, on the other hand, a transmission reserving process is performed so that the image data will be automatically transmitted and information on the distance, bearing or the like to a wireless LAN connectable area is displayed on the LCD 20 when wireless LAN connection becomes possible. It is preferable that transmission reservation should be held even when the digital camera 1 is powered OFF.

In the process in FIG. 6, the process of transmitting image data to an external device or a sharing site as a transmission destination can be carried out using an ordinary method, and will not be elaborated. Further, it is assumed that setting or the like of the transmission destination has already been done by the user.

First, it is determined in step S21 whether or not transmission of a photograph has been set. When it is determined in step S21 that transmission of a photograph has not been set, the transmission process is terminated in step S29.

When it is determined in step S21 that transmission of a photograph has been set, the control section 15 is controlled to search for access points in step S22. As a result, information on an access point located near the digital camera 1, such as the MAC address, SSID and signal intensity, is acquired.

Subsequently, in step S23, it is determined whether or not the acquired SSID matches with an SSID included in the registered AP information DB. When it is determined that the acquired SSID has a match, the MAC address of the access point is stored, and the process goes to step S30. In step S30, the wireless LAN connecting process and the image data transmitting process are executed, after which the process is terminated. When it is determined that the acquired SSID does not have a match, the process goes to step S24.

In step S24, a transmission reserving process is performed. As the SSID does not have a match at this time, image data cannot be transmitted. Therefore, transmission reservation is made so that the image data can be transmitted when an access point which has a matching SSID is detected later. The transmission reservation may be automatically executed by the control section 15, and the execution of the transmission reservation may be displayed on, for example, the LCD 20. Alternatively, a user may determine whether or not to execute transmission reservation, and the transmission reserving process may be performed when the user determines to execute transmission reservation. When the user does not determine to execute transmission reservation, however, the process can proceed to step S29 to terminate the process.

When transmission reservation is made in step S24, the current position of the digital camera 1 is extracted in step S25. The current position is extracted by the method described earlier. Then, the distance and bearing to the access point are extracted from the latitude/longitude information of the current position and the latitude/longitude information of the access point included in the registered AP information DB. Because a registered access point has a history of connections with the digital camera 1 already made, it is considered possible to connect to the registered access point without actually making an attempt to establish connection near the registered access point.

In next step S27, an access point nearest to the current position is detected based on the distance/bearing information extracted in step S26. Then, in step S28, the distance/bearing information is displayed on, for example, the LCD 20, after which the process is terminated.

Figure 7A:
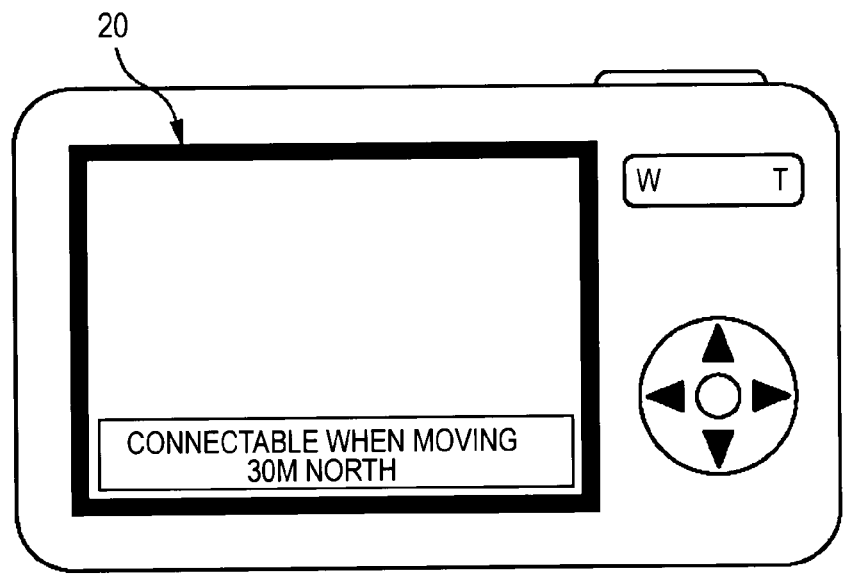
FIGS. 7A and 7B are outlined line diagrams showing one example of the display of connectable locations in the digital camera according to the embodiment of the invention.

The detected access point nearest to the current position is displayed on, for example, the LCD 20 as shown in FIG. 7A. When map information is stored in the digital camera 1, a map including, for example, the current position and the extracted access point may be displayed on the LCD 20. Further, for example, it may be possible to increase or decrease the magnification of the displayed map using the zoom button and move the display position of the map using the direction buttons.

In addition, a plurality of access points, not only a nearest access point, may be displayed on the LCD 20. For example, a plurality of access points extracted in the closer-to-farther order of the distance can be displayed on the LCD 20.

A description will now be given of a case where, for example, the digital camera 1 is in the state as shown in FIG. 2 in steps S23 to S28. In FIG. 2, top three access points 62b, 62a, 62c which are near the current position of the digital camera 1 which is detected based on the access points 61a to 61c whose SSIDs do not match with one another are extracted. The access point 62b is located at a position 30 m away from the digital camera 1 in the North direction. The access point 62a is located at a position 80 m away from the digital camera 1 in the South West direction. The access point 62c is located at a position 100 m away from the digital camera 1 in the North West direction.

Figure 7B:
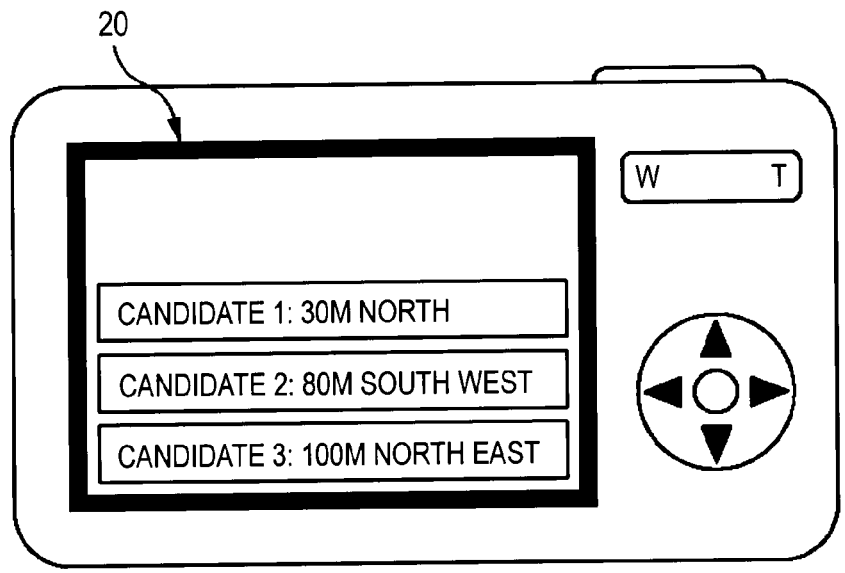

In such a case, the positions of the access points 62b, 62a, 62c are displayed on the LCD 20 in the closer-to-farther order of the distance as shown in FIG. 7B. When map information is stored in the digital camera 1, a map including the current position and the selected access point can be displayed on the LCD 20 by, for example, selecting and setting access point display with the operation buttons.

In the foregoing description of the process, information on the distance and bearing or the like to a wireless LAN connectable place is displayed on the LCD 20, which is not restrictive. For example, the information may be notified by voice from a speaker (not shown) provided in the digital camera 1.

Alternatively, a user may preset the access point display range, so that the information is displayed on the LCD 20 only when a registered access point lies in the set range (for example, within 50 m).

Although the foregoing description of the embodiment has been given of the process of displaying a single registered access point or a plurality of registered access points close to the digital camera 1, a connectable access point can be displayed by the following methods instead.

Other Embodiments

FIG. 8 shows another example of the AP position information DB. In the AP position information DB in FIG. 8, a public wireless LAN connecting service provider using each access point and shop information which is the name of a shop or the like where an access point is set in addition to the MAC address and latitude/longitude information as position information of an access point are stored in association with each access point. Further, the number of connections to each access point is also stored.

FIG. 9 shows a further example of the registered AP information DB. In the registered AP information DB in FIG. 9, the public wireless LAN connecting service provider and the shop information in addition to the SSID, the verification key, the MAC address and latitude/longitude information as position information of an access point are stored in association with each access point.

In the registered AP information DB shown in FIG. 9, an access point whose number of connections is 0 (connecting service provider; Company A, MAC address; FF-FF-FF-FF-FF-FF) can be included in the database as a connectable access point. This is because that the access point has a SSID and verification key common to those of other access points of the company A which has a history of connections already made, and can therefore be considered as being connectable without having a history of connections. As an access point which can be considered as being connectable is added into the registered AP information DB regardless of whether it has a history of connections, the user can be informed of a larger number of access points as connectable places, thus making it possible to improve the convenience of the user.

It is to be noted that if the digital camera 1 does not have an AP position information DB as shown in FIG. 8, for example, access points can be added into the registered AP information DB by downloading data from a public wireless LAN connecting service provider with whom the user has made a contract.

Figure 10A:
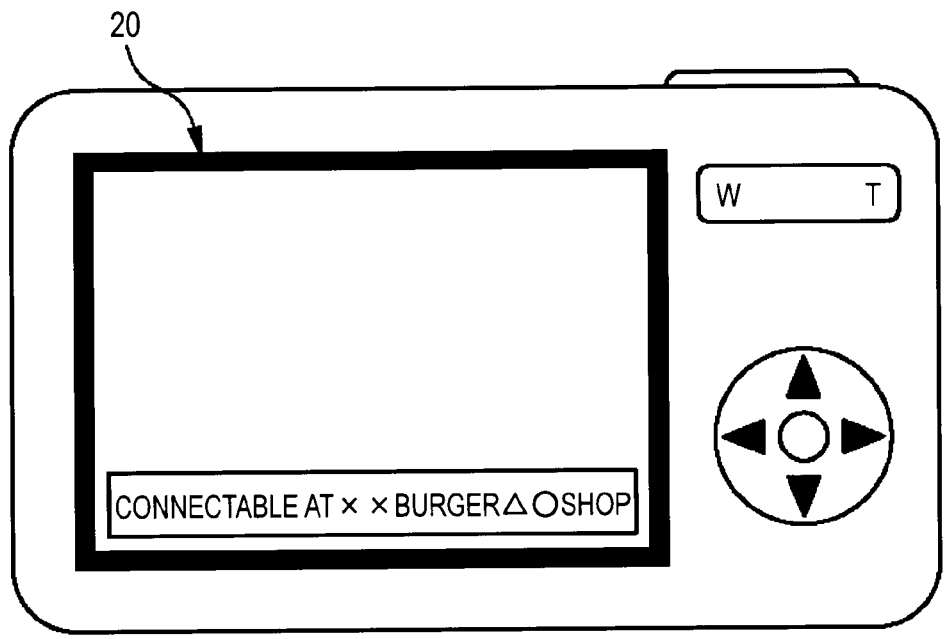
FIGS. 10A and 10B are outlined line diagrams showing another example of the display of connectable locations in the digital camera according to the embodiment of the invention.
Figure 10B:
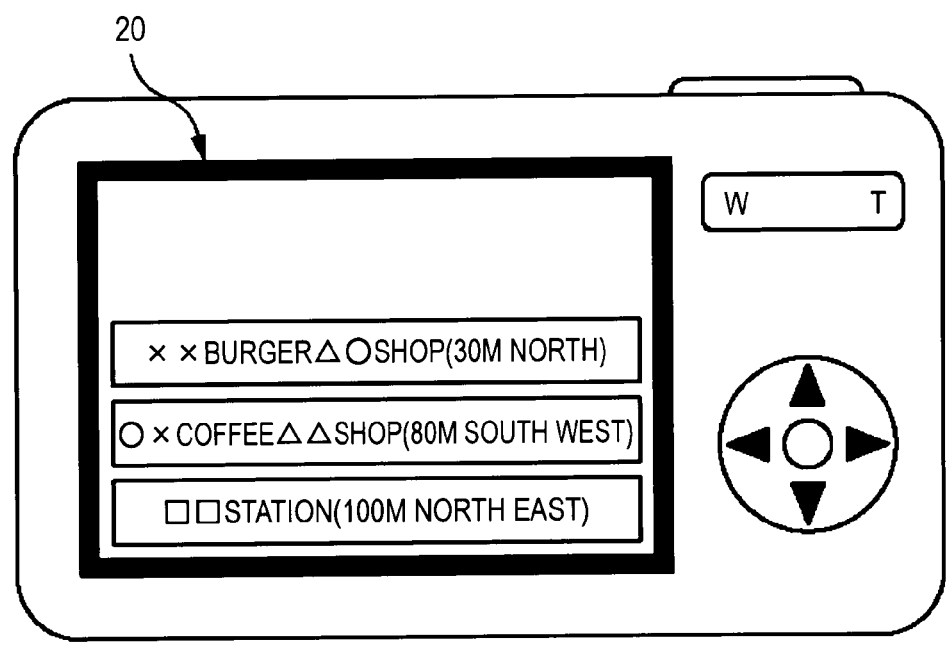

When such a registered AP information DB is used, it is possible to extract shop information in place of the distance and bearing and display the shop information as shown in FIG. 10A in step S28 in the process illustrated in FIG. 6. A shop name and distance/bearing information may be combined or a plurality of shop names may be displayed in the closer-to-farther order of the distance as shown in FIG. 10B.

With such a registered AP information DB in use, it is possible to detect a registered access point which has the greatest number of connections among registered access points present within, for example, a predetermined range in step S27 in the process illustrated in FIG. 6. Then, the distance and bearing may be displayed in step S28 to provide a display which matches with the preference of a user. Further, it is possible to display shop information instead of displaying the distance and bearing information. It is preferable to display a plurality of registered access points in the order of the number of connections. Furthermore, a charge fee which originates from the use of the service or the speed of the network provided by the service may be displayed, so that a fee and transmission time can be provided as materials for determining an access point to which a user wants to establish connection.

Further, route data from the current position to a connectable access point may be received over a wireless LAN network and displayed.

The use of such a digital camera permits a connectable access point to be displayed once wireless LAN connection is disabled. Therefore, the next attempt to establish wireless LAN connection is made after the user moves near a connectable access point, thus eliminating the need for the configuration of constantly detecting access points. This can suppress wasteful power consumption, thus suppressing the interference of power consumption on the original purpose of the digital camera to pick up an image.

Although the embodiments of the present invention have been described specifically herein, the invention is not limited to the embodiments, an may be modified in various other forms based on the technical concept of the invention.

For example, although the embodiments use the method of acquiring current position information from the signal intensities of a plurality of access points, GPS may be used instead of or in addition to the method.

The configuration of the digital camera is a generally used configuration, and is not restrictive.

The present application contains subject matter related to that disclosed in Japanese Priority Patent Application JP 2008-254416 filed in the Japan Patent Office on Sep. 30, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal device comprising:
a communication means radio communicatable to access points;
a storage means for storing a database associating identification information and position information of an access point connected with the communication means in association with each other;
a position information acquiring section that acquires current position information; and
a control section that causes a display section to display related information of the access point based on the database when the communication means does not detect a connectable access point, and when a transmission request for data is input to the control section and the communication means is unable to perform radio communication, the control section makes a transmission reservation to schedule transmission of the data at a later time when the communication means is able to perform radio communication with the access point.

2. The terminal device according to claim 1, wherein the related information is at least one of distance information and bearing information from a current position to the access point, and name information of the access point.

3. The terminal device according to claim 2, wherein the control section arranges the related information of access points registered in the database in an order of a distance from the current position or a number of connections established to the access points, and causes the display section to display the related information.

4. The terminal device according to claim 2, wherein the position information acquiring section acquires the current position information based on information from a GPS or MAC addresses of a plurality of access points and signal intensities thereat.

5. The terminal device according to claim 4, wherein when a transmission request for data is input to the control section, the control section causes the display section to display that the transmission reservation is made when the communication means becomes radio communicatable, with the transmission reservation being made.

6. The terminal device according to claim 5, further comprising image pickup means that picks up an image of a subject, wherein the data is picked-up image data of the subject.

7. The terminal device according to claim 4, where the related information of the access point further includes a map around the access point.

8. The terminal device according to claim 7, where the related information of the access point further includes route information from a current position to the access point.

9. A display method comprising:
causing communication means to establish radio communication to access points;
storing a database associating identification information and position information of an access point connected with the communication means in association with each other;
acquiring current position information;
causing display means to display related information of the access point based on the database when the communication means does not detect a connectable access point; and
when a transmission request for data is input and the communication means is unable to perform radio communication, making a transmission reservation to schedule transmission of the data at a later time when the communication means is able to perform radio communication with the access point.

10. A non-transitory computer readable recording medium recording a program that allows a computer to execute a method comprising:
causing communication means to establish radio communication to access points;
storing a database associating identification information and position information of an access point connected with the communication means in association with each other;
causing acquisition means to acquire current position information; and
causing display means to display related information of the access point based on the database when the communication means does not detect a connectable access point; and when a transmission request for data is input and the communication means is unable to perform radio communication, making a transmission reservation to schedule transmission of the data at a later time when the communication means is able to perform radio communication with the access point.

11. A terminal device comprising:

a communication section radio communicatable to access points;

a storage section that stores a database associating identification information and position information of an access point connected with the communication section in association with each other;

a position information acquiring section that acquires current position information; and a control section that causes a display section to display related information of the access point based on the database when the communication section does not detect a connectable access point, and when a transmission request for data is input to the control section and the communication section is unable to perform radio communication, the control section makes a transmission reservation to schedule transmission of the data at a later time when the communication section is able to perform radio communication with the access point.

* * * * *